United States Patent
Göransson et al.

(10) Patent No.: US 6,737,092 B1
(45) Date of Patent: May 18, 2004

(54) METHOD OF MAINTAINING THE PRESSURE DIFFERENCE IN A HEAT TREATMENT PLANT

(75) Inventors: Christer Göransson, Malmö (SE); Magnus Jansson, Greenwood, IN (US); Bengt Palm, Genarp (SE)

(73) Assignee: Tetra Laval Holdings & Finance SA, Pully (CH)

( * ) Notice: Subject to any disclaimer, the term of this patent is extended or adjusted under 35 U.S.C. 154(b) by 0 days.

(21) Appl. No.: 09/674,262
(22) PCT Filed: Apr. 28, 1999
(86) PCT No.: PCT/SE99/00696
§ 371 (c)(1), (2), (4) Date: Dec. 22, 2000
(87) PCT Pub. No.: WO99/55175
PCT Pub. Date: Nov. 4, 1999

(30) Foreign Application Priority Data

Apr. 29, 1998 (SE) .............................. 9801507

(51) Int. Cl.[7] .............................. A23C 3/00; A23L 2/00
(52) U.S. Cl. .................. 426/231; 426/521; 426/522
(58) Field of Search .................. 426/231, 520, 426/521, 522; 165/66

(56) References Cited

U.S. PATENT DOCUMENTS 2,197,118 A  4/1940  Astle
4,997,662 A  * 3/1991  Lidman et al. ............. 426/522
5,443,857 A  * 8/1995  Arph et al. ................. 426/522

FOREIGN PATENT DOCUMENTS

DE  4025570 A1  10/1991
DE  29710507 U1  9/1997
EP  0554961 A1  8/1993

* cited by examiner

Primary Examiner—George C. Yeung
(74) Attorney, Agent, or Firm—Burns, Doane, Swecker & Mathis, L.L.P.

(57) ABSTRACT

The invention relates to a method of maintaining the pressure difference in a heat treatment plant such as, for example, a pasteurizer for liquid foods. In a temporary production disruption, the insufficiently treated product is caused to recycle by a return stroke. The pressure difference is maintained in that the already heat-treated product is enclosed in a conduit on the downstream side (14) of the plant, and that the space for the product in the conduit is restricted. The space for the product is restricted either in that a food gas is led into the conduit, or alternatively that the product conduit (29) is provided with an expansive portion (27). The expansive portion (27) consists of a pipe length (28) with an inner elastic wall (30) which expands by means of a gas or a liquid.

5 Claims, 3 Drawing Sheets

METHOD OF MAINTAINING THE PRESSURE DIFFERENCE IN A HEAT TREATMENT PLANT

TECHNICAL FIELD

The present invention relates to a method of maintaining the pressure difference in a heat treatment plant for liquid food products, of the type in which, in a production disruption, the insufficiently treated product is caused to recycle by a return stroke.

BACKGROUND ART

The method is intended to be used in a plant for heat treatment of the type which is described in Swedish Patent Specification SE 9203213-5. Such a heat treatment plant is intended for pasteurising liquid food products, such as milk. The plant essentially comprises a plate heat exchanger, divided into a cooler section, one or more regenerative sections and a heater section. The plant also includes a retainer cell, normally placed outside the heat exchanger, pumps, balance tank and a number of pressure and temperature meters. Further components which may also belong to the plant are a separator, standardisation equipment and a homogeniser. The various part included in the plant are interconnected to form a unit by means of conduits. The unit is a plant for heat treatment of liquid food products, a pasteuriser.

The heat treatment plant is intended to heat the product to a certain, preselected temperature and keep the product at this temperature for a given time. The temperature in pasteurisation is normally 72–75° C. and the time interval is 15–20 seconds.

In the heat treatment plant which is intended, use is made of regenerative sections, i.e. use is made of the heated, ready-pasteurised product which is on its way out of the plant to heat up the cold product which is entering the plant. As a result of this procedure, a high thermal degree of efficiency will be attained in the plant. At the same time, care must be taken to ensure that the pasteurised product is at a higher pressure than the unpasturised product so that, in the event of untightness between the plates in the heat exchanger, there is no risk that unpasteurised product leak out into the pasteurised product. The problem may be wholly obviated by simply using water as the thermal transfer mediums, which, however, radically reduces the degree of efficiency of the plant. Use may also be made f a heat exchanger with double plates, having a space for drainage of leaking product but this renders the plant considerably more expensive.

Thus, the striving is to maintain an excess pressure on the pasteused product, which may constitute a problem since, in the event of production disruption, there may be a temporary pressure drop. The authorities in different countries will probably in future issue stricter regulations relating to pasteurisation safety and, as a result, the demands of being able to maintain the pressure difference so as not to run the risk that unpasteurised product infects the already pasteurinsed product.

In production disruptions such as varying temperature of the incoming product into the pasteuriser, brief disruptions in steam supply or variations in the fat content of the product, a product which has not reached the correct temperature may leave the heater section. Such incompletely heated product is recycled to the balance tank, or is alternatively recycled over a larger or smaller part of the plate heat exchanger. During this time, operational security must be sustained by a maintained excess pressure on the already pasteurised product. The longer the operational downtime, the more difficult it will be to maintain the excess pressure.

OBJECT OF THE INVENTION

One object of the present invention is, in a simple and reliable manner, to ensure that the excess pressure is maintained on the pasteurised product when a temporary pressure drop occurs in connection with a production disruptions.
SOLUTION This and other objects have been attained according to the present invention in that the method of the type described by way of introduction has been given the characterizing feature that the pressure difference after a return stroke is maintained in that the treated product is enclosed in a conduit on the downstream side of the plant, and that the space for the product there is restricted.

Preferred embodiments of the method according to the present invention have further been given the characterizing features as set forth in the appended subclaims.

BRIEF DESCRIPTION OF THE ACCOMPANYING DRAWINGS

Preferred embodiments of the present invention will now be described in greater detail hereinbelow, with reference to the accompanying Drawings, in which.

DESCRIPTION OF PREFERRED EMBODIMENTS

Figure 1:
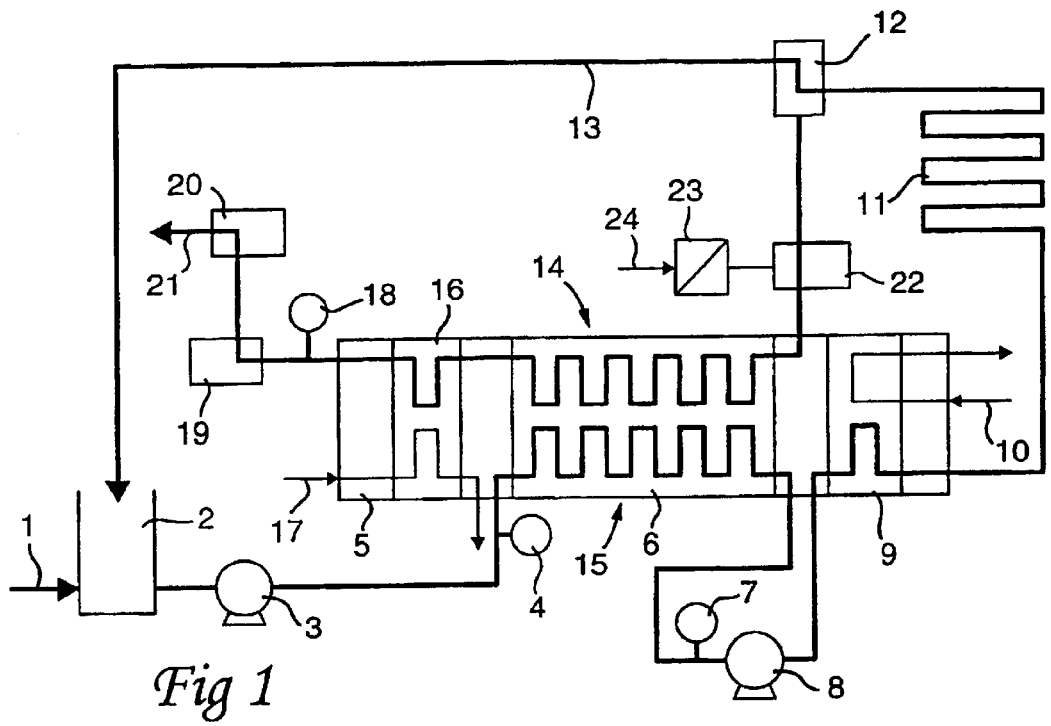
FIG. 1 is a flow diagram of a heat treatment plant, according to a first embodiment.

A heat treatment plant of the type in which the method according to the present invention may be employed is shown in FIGS. 1–4. The product enters in a conduit 1 into the plant, passes a balance tank 2 and is fed by means of pump 3, via a pressure indicator 4, into that part of a plate heat exchanger 5 which consists of a regenerative section 6. In FIGS. 1–4, one regenerative section 6 is shown, but the heat exchanger 5 may, depending upon the design of the plant, include two or more regenerative sections 6. In the regenerative section 6, the incoming product into the plant is heated by the heated product which is departing from the plant.

Between the different regenerative sections 6 in a heat exchanger 5, the plant may also include a separator, standardisation equipment and homogeniser. However, these parts are not shown on the Drawings.

After the regenerative section or sections 6, the product passes a pressure indicator 7 and a pressure booster pump 8 before passing further in to the heater section 9 of the heat exchanger 5. In the heater section 9, the product is heated with hot water or steam which is led in to the heat exchanger 5 in a conduit 10. The product in the heater section 9 is to reach a certain, preselected temperature, normally between 72 and 75° C. The pressure booster pump 8 may alternatively consist of a homogeniser.

The product heated to a preselected temperature level thereafter passes further to a retainer cell 11. The retainer cell 11 normally consists of a helical conduit where the product is kept for a given period of time. A normal time range is between 15 and 20 seconds. A temperature indicator (not shown) after the retainer cell 11 is provided for reading off that the product is kept at the desired temperature.

After the retainer cell, the product passes into a return stroke valve 12. If the correct temperature has been reached and maintained for the requisite time, the product will have achieved sufficient treatment and the thus ready-treated product is employed in the regenerative section 6 for heating the product coming into the plant. If the correct temperature has not been reached or it has not been possible to maintain it for the requisite time, a return stroke takes place in the return stroke valve 12 and the insufficiently treated product passes into a return conduit 13 back to the balance tank 2.

In normal production without disruptions, the ready-treated product thus passes once again through the regenerative section or sections 6 and the heated product on the downstream side 14 of the heat exchanger 5 preheats the cold product on the upstream side 15 of the heat exchanger 5.

From the regenerative section 6, the product thereafter passes into a cooler section 16 which also constitutes a part of the heat exchanger 5. In the cooler section 16, the product is cooled, normally by means of cold water. Cold water or other coolant passes into the heat exchanger via a conduit 17.

After the heat exchanger 5, the product passes a new pressure indicator 18 and a constant pressure valve or counter pressure valve 19. The pressure valve 19 ensures, under normal production, that the downstream side 14 of the heat exchanger 5 is at a higher pressure than the upstream side 15 of the heat exchanger 5. Via a shut-off valve 20, the now ready-treated product passes further into a conduit 21 for transport to a filling machine where the product is packed into consumer packages, or alternatively to further processing of the product, before packing.

The pressure difference in a heat treatment plant is the difference between the pressure measured by the pressure indicator 18 placed on the downstream side 14 of the pasteuriser and the pressure which is measured by the pressure indicator 4 placed on the upstream side 15 of the pasteuriser. The difference must have a certain positive value in order for it to be sure that the downstream side 14 of the regenerative section 6 is at a higher pressure than the upstream side 15 and that no unpasteurised product can leak into the pasteurised product. The placing of the pressure indicators 4 and 18 is shown in the Drawings in that position where the pressure difference is at its lowest, but alternative placings are possible.

The pressure difference is maintained under normal production by the counter pressure or constant pressure valve 19. When production disruptions occur, which, for example may be because of varying temperature of the incoming product, or brief disruptions in steam supply to the heater section 9, this results in the product not being given sufficient treatment. The return stroke valve 12 is activated and the insufficiently treated product is led in return in the conduit 13 back to the balance tank 2. When this occurs, the pressure valve 19 cannot reliably cater for maintaining the pressure difference. The longer the production downtime is, the greater will be the risk that the pressure difference falls below an unacceptable level.

According to the present invention, the pressure difference may be maintained in that the treated product on the downstream side 14 of the pasteuriser is enclosed between the return stroke valve 12 and the shut-off valve 20, at the same time as the space for the product is restricted in this screened-off section of the plant. In that the space in the conduits is restricted, the pressure of the product increases.

Figure 2:
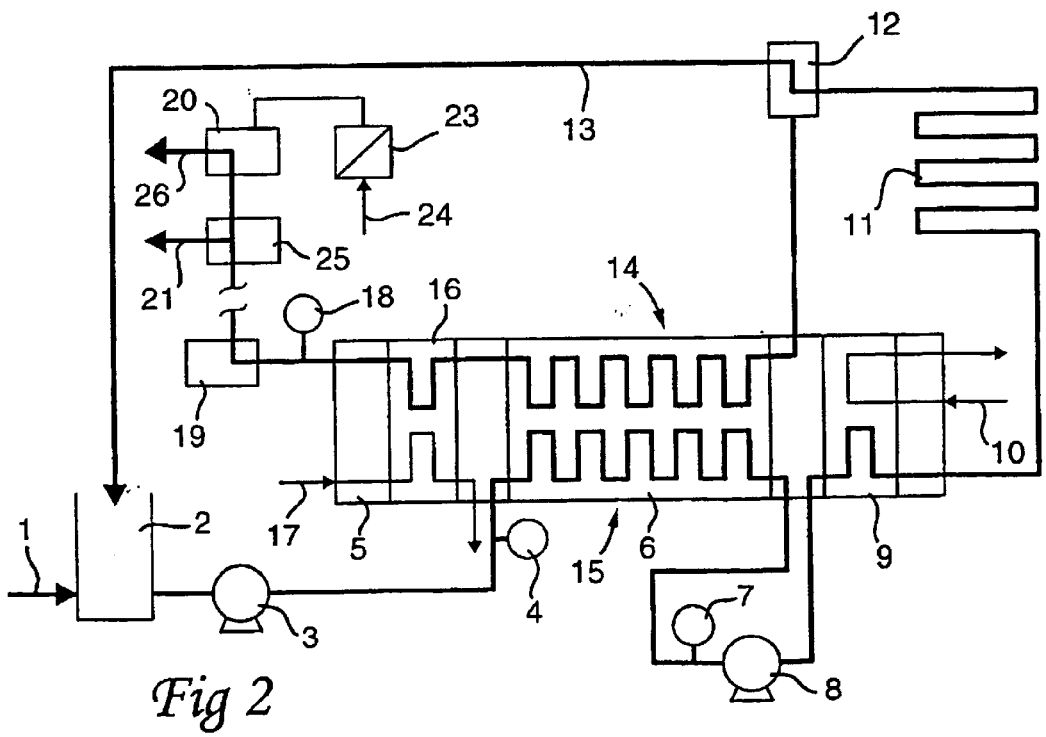
FIG. 2 is a flow diagram of a heat treatment plant, according to a second embodiment.

FIGS. 1 and 2 show a first and second embodiment of the present invention, where a gas is led into that section of the product conduit which is closed off during a return stroke. The gas forms a "cushion" in the conduit which restricts the space for the product and the conduit increases. The gas may consist of sterile-filtered air or an inert food gas, for example nitrogen.

In the first embodiment (FIG. 1) a gas inlet valve 22 is placed between the return stroke valve 12 and the downstream side 14 of the regenerative section 6. The gas inlet valve 22 is connected to a sterile filter 23 and gas is introduced into the filter in a conduit 24. The sterile filter 23 may be dispensed with in the employment of gas of high quality. In FIG. 2, the shut-off valve 20 also fulfills the function of gas inlet valve. The shut-off valve 20 is connected to a sterile filter 23 and a conduit 24 for gas. Moreover, an additional valve 25 has been provided in this embodiment, from which the conduit 21 departs to the filling machine or the like. A conduit 26 which constitutes a return conduit departs from the shut-off valve 20.

At the same time as the return stroke valve 12 is activated and the shut-off valve 20 closes (or alternatively with a slight time-lag), the gas inlet valve 22 opens and remains open throughout the time when the return stroke valve 12 is activated. In the second embodiment, the inlet of gas is opened when the shut-off valve 20 shuts against the conduit 26, since the inlet of gas takes place through the shut-off valve 20. In this second embodiment, the valve 25 also shuts against the conduit 21 on return stroke.

When the return stroke valve 12 is once again deactivated, the gas inlet valve 22 closes or alternatively the shut-off valve 20 stops the inlet of gas. The product will once again flow in the conduit which had been closed and the "gas cushion", as good as intact, will accompany the product. In a sterile tank (not shown) which normally precedes a filling machine, the gas will bubble up and leave the product.

In that case when the product consists of a juice and use is made of sterile air as the space restricting gas, the second embodiment may be preferable, since the air has an oxidising effect on the juice, which gives a deterioration in flavour. As a result of the placing of the gas inlet after the conduit 21 to the filling machine, a very slight quantity of the product is affected by the air, and the product which is subjected to such action may be removed from production through the conduit 26. Alternatively, this embodiment may be employed for products which are not sensitive to air. The valve 25 serves no function in such a design and can, as a result, be dispensed with.

Figure 3:
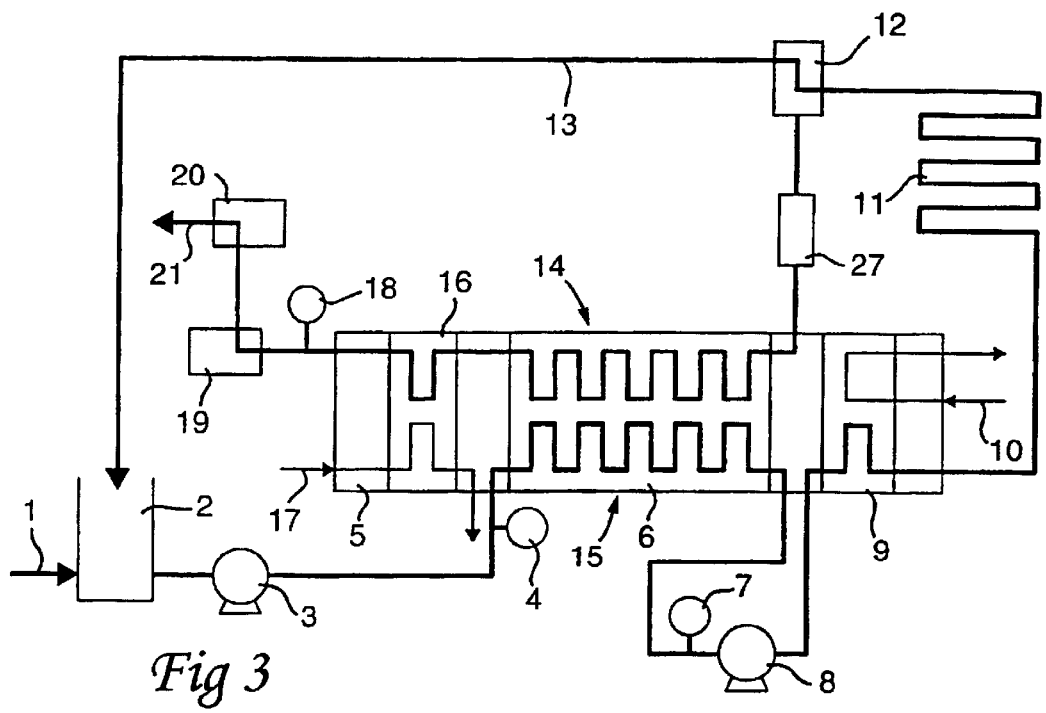
FIG. 3 is a flow diagram of a heat treatment plant, according to a third embodiment.
Figure 4:
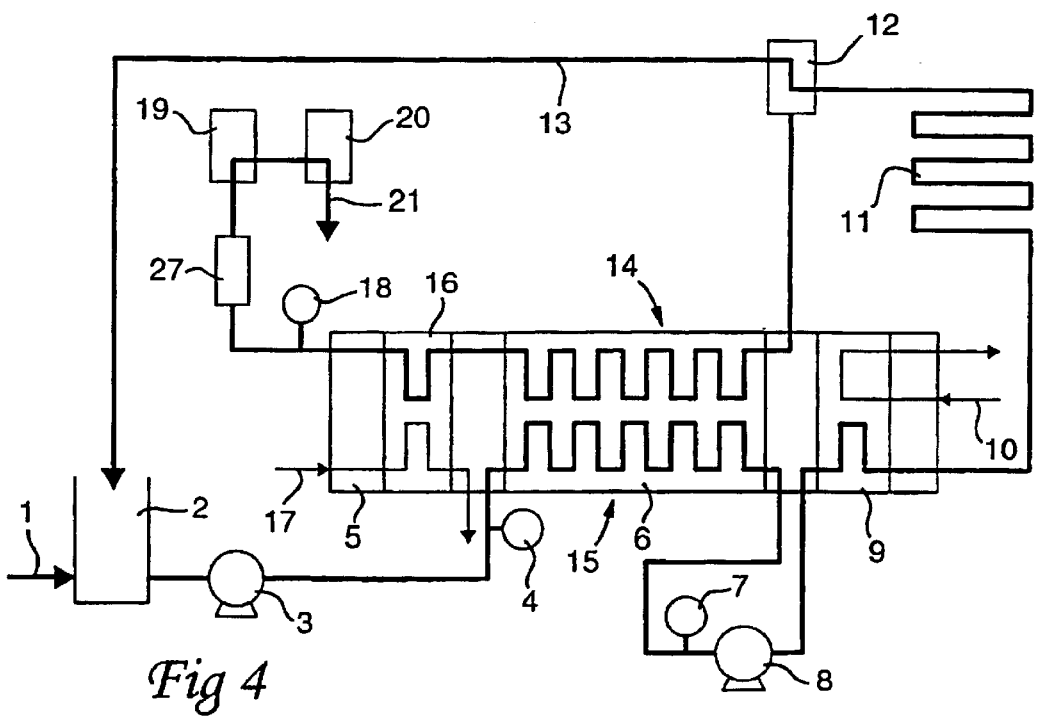
FIG. 4 is a flow diagram of a heat treatment plant, according to a fourth embodiment.
Figure 5:
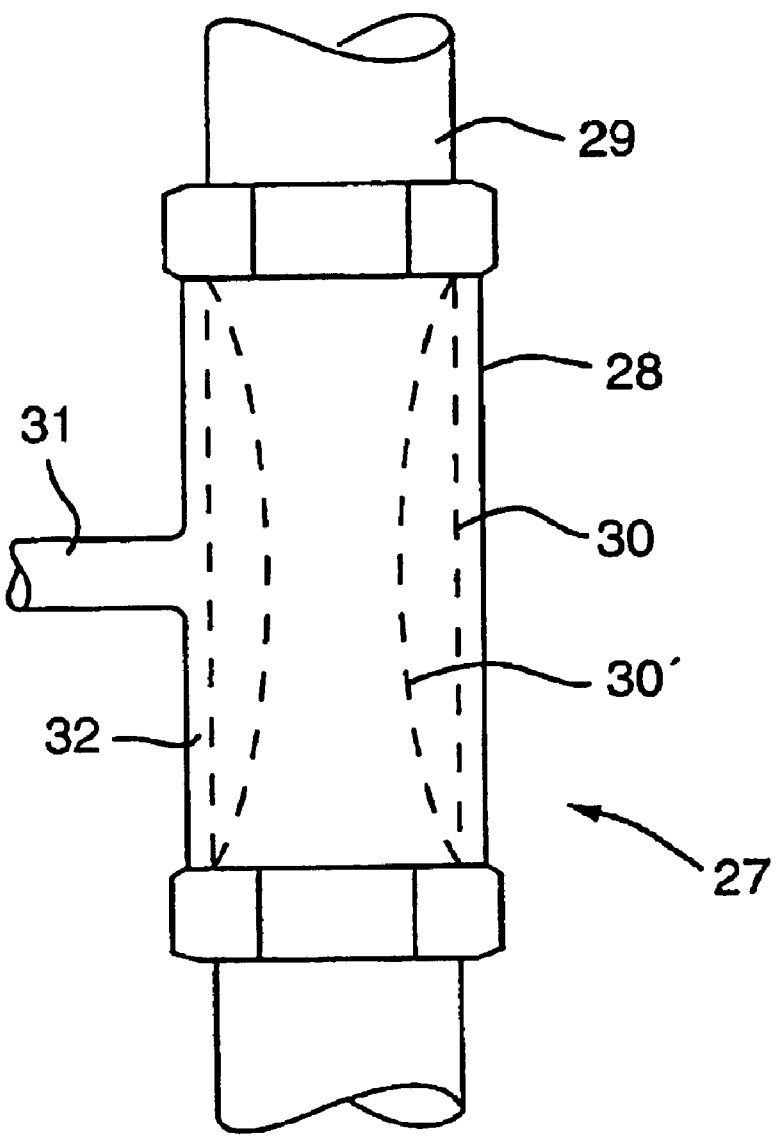
FIG. 5 shows an expansive portion of a product conduit according to the third and fourth embodiments.

A third and fourth embodiment of the present invention are shown in FIGS. 3 and 4. The space for the product is restricted in these embodiments in that an expansive portion 27 is placed in the shut-off section of the conduit. A detailed version of an expansive portion is shown in FIG. 5. In the third embodiment, the expansive portion 27 is placed between the return stroke valve 12 and the downstream side 14 of the regenerative section 6. In the fourth embodiment, the expansive portion 27 is to be found between the cooler section 16 and the counter pressure valve 19.

In principle, the expansive portion consists of a pipe length 28 coupled in on the regular product conduit 29. In the pipe length 28, there is an inner wall 30 of an elastic material such as silicon rubber. The pipe length 28 displays, on its circumferential surface, a connection 31 for liquid or gas. The connection 31 for liquid or gas is in direction communication with an interspace 32 between the pipe length 28 and the elastic wall 30.

By supplying gas or liquid under pressure to the interspace 32, the wall 30 expands and thereby restricts the space for the product which is located in the conduit 29. FIG. 5 shows the wall 30 in both the expanded (30') and unexpanded (30) states.

Simultaneously with the activation of the return stroke valve 12 and the shut-off valve closing against the conduit 20 (alternatively with some time-lag), a gas or liquid is passed through the connection 31 in the interspace 32, and the wall expands. The expanded wall 30' reduces the space for the product in the conduit 29 and the pressure in the conduit 29 increases. When the return stroke valve 12 returns to start and normal production takes over, the liquid or gas is sucked out of the interspace 32 and the wall 30 returns to normal state.

As will have been apparent from the foregoing description, the present invention realises a method of maintaining, in a simple and reliable manner, the pressure difference in a heat treatment plant for liquid foods in connection with brief production disruptions, in that treated product is enclosed on the downstream side of the plant, and in that the space for the product there is restricted, which gives rise to an increase in the pressure.

The present invention should not be considered as restricted to that described above and shown on the Drawings, many modifications being conceivable without departing from the scope of the appended Claims.

What is claimed is:

1. A method of maintaining a pressure difference in a heat treatment plant for a liquid food product, in which, in a production disruption, an insufficiently treated product is caused to recycle by a return stroke, wherein:

a pressure difference after a return stroke is maintained in that a sufficiently treated product is enclosed in a product conduit on a downstream side of the plant; and a space for the sufficiently treated product there is restricted, wherein the sufficiently treated product is enclosed between a return stroke valve and a shut-off valve, and wherein the space for the sufficiently treated product is restricted in that a gas is introduced into the product conduit.

2. The method as claimed in claim 1, wherein the gas is led into the product conduit between the return stroke valve and a regenerative section of the downstream side of the plant.

3. The method as claimed in claim 1, wherein the gas is led into the product conduit in the shut-off valve.

4. A method of maintaining a pressure difference in a heat treatment plant for a liquid food product, in which, in a production disruption, an insufficiently treated product is caused to recycle by a return stroke, wherein:

a pressure difference after a return stroke is maintained in that a sufficiently treated product is enclosed in a product conduit on a downstream side of the plant; and a space for the sufficiently treated product there is restricted in that a part of the product conduit comprises an expansive portion which forms a throttle in the product conduit.

5. The method as claimed in claim 4, wherein the expansive of portion comprises a pipe length with an inner elastic wall which expands in that gas or liquid is introduced into an interspace between the pipe length and the inner elastic wall.

* * * * *